United States Patent
Li et al.

(10) Patent No.: US 9,124,475 B2
(45) Date of Patent: Sep. 1, 2015

(54) METHOD AND APPARATUS FOR INTERFERENCE CANCELLATION FOR ANTENNA ARRAYS

(75) Inventors: Li Erran Li, Edison, NJ (US); Thomas Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 506 days.

(21) Appl. No.: 13/270,747

(22) Filed: Oct. 11, 2011

(65) Prior Publication Data
US 2013/0089009 A1    Apr. 11, 2013

(51) Int. Cl.
| | | |
|---|---|---|
| H04B 7/005 | (2006.01) | |
| H04B 1/44 | (2006.01) | |
| H04L 27/26 | (2006.01) | |
| H04L 25/03 | (2006.01) | |
| H04B 7/14 | (2006.01) | |
| H04L 5/16 | (2006.01) | |
| H04L 5/14 | (2006.01) | |

(52) U.S. Cl.
CPC ...... *H04L 27/2601* (2013.01); *H04L 25/03305* (2013.01); *H04B 7/14* (2013.01); *H04L 5/14* (2013.01); *H04L 5/16* (2013.01)

(58) Field of Classification Search
CPC .............. H04L 5/14; H04L 5/16; H04B 7/14; H04B 1/44; H04W 4/00
USPC .................................................. 370/278, 282
See application file for complete search history.

(56) References Cited

U.S. PATENT DOCUMENTS

| | | | |
|---|---|---|---|
| 8,498,585 B2 | 7/2013 | Vandenameele | |
| 2004/0142700 A1* | 7/2004 | Marinier | 455/454 |
| 2006/0239367 A1* | 10/2006 | Wilhelmsson et al. | 375/260 |
| 2008/0089397 A1* | 4/2008 | Vetter et al. | 375/220 |
| 2009/0092067 A1 | 4/2009 | Sudarshan et al. | 370/281 |
| 2009/0135748 A1* | 5/2009 | Lindoff et al. | 370/296 |
| 2011/0143655 A1* | 6/2011 | Ahn et al. | 455/9 |
| 2012/0201173 A1* | 8/2012 | Jain et al. | 370/277 |

FOREIGN PATENT DOCUMENTS

GB    2 019 509 A1    7/2007    ............ H04L 5/02

OTHER PUBLICATIONS

Mohammad A. Khojastepour, Karthikeyan Sundaresan, Sampath Rangarajan, Xinyu Zhang, Sanaz Barghi. "The Case for Antenna Cancellation for Scalable Full Duplex Wireless Communications", In 10th ACM Workshop on Hot Topics in Networks (HotNets), 2011.
Jain, M. et al.,"Practical, Real-Time, Full Duplex Wireless", *MobiCom'* 11, Sep. 19-23, 2011 Las Vegas, Nevada, USA.

(Continued)

*Primary Examiner* — Kodzovi Acolatse
(74) *Attorney, Agent, or Firm* — Davidson Sheehan LLP

(57) ABSTRACT

Embodiments of the claimed subject matter provide methods and apparatuses for interference cancellation. One embodiment of a method includes estimating, for an antenna in an antenna array including a plurality of antennas, interference parameters using analog signals received at the antenna on each of a plurality of subcarriers. Each interference parameter is associated with one of a plurality of symbols transmitted to one of a plurality of users on one of the plurality of subcarriers. This embodiment also includes canceling interference from analog signals received by the antenna on the plurality of subcarriers using the estimated interference parameters.

19 Claims, 6 Drawing Sheets

(56) References Cited

OTHER PUBLICATIONS

Sahai, A. et al., "Pushing the limits of Full-duplex: Design and Real-Time Implementation", Department of Electrical and Computer Engineering, Rice University, Technical Report TREE1104, Jul. 4, 2011.

Choi, J. et al., "Achieving Single Channel, Full Duplex Wireless Communication", *MobiCom' 11*, Sep. 20-24, 2010, Chicago Illinois, USA.

International PCT/US2012/058456 Search Report dated Feb. 6, 2013.

Written Opinion.

\* cited by examiner

METHOD AND APPARATUS FOR INTERFERENCE CANCELLATION FOR ANTENNA ARRAYS

CROSS REFERENCE TO RELATED APPLICATIONS

This application is related to U.S. patent application Ser. No. 13/236,467 filed on Sep. 19, 2011.

BACKGROUND

This application relates generally to communication systems, and, more particularly, to wireless communication systems.

Wireless communication systems typically deploy numerous base stations (or other types of wireless access points such as eNodeBs) for providing wireless connectivity to user equipment such as mobile units or other wireless-enabled devices. Each base station is responsible for providing wireless connectivity to the mobile units located in a particular cell or sector served by the base station. The air interface between the base station and the mobile unit supports downlink (or forward link) channels for carrying information from the base station to the mobile unit and uplink (or reverse link) channels for carrying information from the mobile unit to the base station. The uplink and/or downlink channels typically include data channels for carrying data traffic such as voice information and control channels for carrying control signal such as pilot signals, synchronization signals, acknowledgment signals, and the like.

Multiple-input-multiple-output (MIMO) techniques may be employed when the base station and, optionally, the user terminals include multiple antennas. For example, a base station that includes multiple antennas can transmit multiple independent and distinct signals to multiple users concurrently and on the same frequency band. MIMO techniques are capable of increasing the spectral efficiency (e.g., the number of bits/second/Hertz) of the wireless communication system roughly in proportion to the number of antennas available at the base station. However, the base station also requires information about the state of the downlink channel(s) to each of the users to select users that have approximately orthogonal downlink channels for concurrent transmission. The channel feedback may be provided by the users on the reverse link, but this increases overhead associated with the MIMO transmissions, which reduces the spectral efficiency of the wireless communication system.

Random fluctuations in the channel states can create sets of downlink channels that are approximately orthogonal. Thus, if the number of users associated with a base station is large, these random fluctuations naturally tend to create groups of users that have approximately orthogonal downlink channels. Opportunistic MIMO schemes identify these groups of users so that the interference between the concurrent transmissions from the base station to the users in the selected group is within an acceptable tolerance level. For example, let $n_T$ denote the number of transmit antennas at the base station and let K indicate the number of users connected to the base station. In conventional systems, the number of transmit antennas at the base station $n_T$ is smaller than the number of users K connected to the base station. Each user is equipped with $n_R$ receive antennas. The channel coefficients between each transmit antenna and each receive antenna at user k can be assembled into an $n_R \times n_T$ matrix $H_k$, k=1, . . . , K.

In a multi-user MIMO system that employs linear unitary pre-coding matrices, the base station can transmit concurrently to as many as $n_T$ users, which can be chosen from the population of K users. The relationship between transmit and receive signals can be represented as:

$$y = HUs + n \qquad (1)$$

where s is an $n_T$-dimensional vector containing the transmit signals, y is the $n_R$-dimensional vector of received signals, n is an $n_R$-dimensional noise vector, and U is an $n_T \times n_T$ unitary pre-coding matrix, i.e., a matrix satisfying $UU^H = I$. Note that some of the entries of s may be zero if the base station chooses to transmit to less than $n_T$ users (this is sometimes termed "rank adaptation"). Each base station typically stores a codebook consisting of L pre-coding matrices, $U_i$, i=1, . . . , L. Altogether, the L pre-coding matrices amount to $n_T \cdot L$ column vectors, where each column vector has $n_T$ entries.

The pre-coding matrices map the signals onto the available channels. The base station can vary this mapping to adapt to the channel conditions by selecting different pre-coding matrices based on the base station's knowledge of the matrices $H_k$, k=1, . . . , K. Information about the matrix $H_k$ can be reported to the base station using feedback from the mobile unit. For example, when the base station implements an opportunistic scheme, each user periodically reports a preferred subset of the column vectors in the codebook via the reverse link to the base station. The users also report a quality indicator corresponding to a hypothetical transmission associated with each preferred column. The size of the subset of columns that can be selected and reported by each user is a parameter that can be anywhere between 1 and $n_T \cdot L$. For each pre-coding matrix $U_i$ in the codebook, the base station identifies those users that have expressed preference for a column vector from that matrix $U_i$ and associates those users with that matrix $U_i$. Only one user can be associated with each column, so if several users have expressed preference for the same column vector of that matrix $U_i$, only one of those users is retained in the association (this can be done randomly or based on priorities). Thus, there are at most $n_T$ users associated with each matrix $U_i$. Note that each user could be associated with multiple pre-coding matrices $U_i$.

The base station selects one of the pre-coding matrices, e.g. on the basis of priorities of the users associated with the matrices $U_i$. The priorities can be determined by a scheduler in the base station. Once the matrix and associated users have been identified, the base station can begin concurrent transmission to the selected users using the corresponding pre-coding matrices $U_i$.

Base stations in conventional MIMO systems use a relatively small number of antennas (e.g., typically 2-4 antennas) to transmit and receive signals. The number of antennas is also typically significantly smaller than the number of users served by the base station. Consequently, the spatial channels can be determined using a reasonable amount of overhead to transmit feedback to the base station from the user equipment. Moreover, brute force techniques can be used to schedule packet transmissions over the channels by considering all possible combinations of users.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method for interference cancellation is provided. One embodiment of the method includes estimating, for an antenna in an antenna array comprising a plurality of antennas, interference parameters using analog signals received at the antenna on each of a plurality of subcarriers. Each interference parameter is associated with one of a plurality of symbols transmitted to one of a plurality of users on one of the plurality of subcarriers. This embodiment also includes canceling interference from analog signals received by the antenna on the plurality of subcarriers using the estimated interference parameters.

In a further embodiment of the method, the number of interference parameters for the antenna is independent of the number of other antennas in the antenna array.

In a further embodiment of the method, estimating the interference parameters includes estimating the interference parameters to minimize differences between the analog signals received at the antenna and products of the interference parameters and the corresponding symbols.

In a further embodiment of the method, canceling interference from the analog signals received by the antenna includes canceling interference from a baseband signal received by the antenna.

In a further embodiment of the method, canceling interference from the analog signals received by the antenna includes canceling interference from a radiofrequency signal received by the antenna.

In a further embodiment of the method, the method includes converting the analog signals to digital signals after canceling the interference from the analog signals.

In a further embodiment of the method, estimating the interference parameters includes estimating the interference parameters based upon the digital signals.

In a further embodiment, the method includes pre-coding the plurality of symbols for transmission over the air interface concurrently with canceling interference from the analog signals received by the antenna on the plurality of subcarriers.

In a further embodiment, the method includes transmitting the plurality of symbols in full-duplex mode and concurrently receiving uplink signals from the plurality of users transmitting in full-duplex mode.

In a further embodiment, the method includes transmitting the plurality of symbols in full-duplex mode and concurrently receiving uplink signals from subsets of the plurality of users transmitting in half-duplex mode.

In a further embodiment, the method includes scheduling the subsets of users for reception or transmission in half-duplex mode based on at least one of an estimate of inter-user interference or locations of the users.

In a further embodiment, the method includes estimating interference parameters for each antenna in the antenna array and canceling interference from analog signals received by the plurality of antennas in the antenna array using the estimated interference parameters.

In another embodiment, a transceiver is provided for interference cancellation. One embodiment of the transceiver is configured to be communicatively coupled to an antenna in an antenna array comprising a plurality of antennas. One embodiment of the transceiver includes adaptive interference logic configured to estimate interference parameters using analog signals received at the antenna on each of a plurality of subcarriers. Each interference parameter is associated with one of a plurality of symbols transmitted to one of a plurality of users on one of the plurality of subcarriers. This embodiment of the transceiver also includes circuitry configured to cancel interference from analog signals received by the antenna on the plurality of subcarriers using the estimated interference parameters.

In a further embodiment of the transceiver, the number of interference parameters for the antenna is independent of the number of other antennas in the antenna array.

In a further embodiment of the transceiver, the adaptive interference logic is configured to estimate the interference parameters to minimize differences between the analog signals received at the antenna and products of the interference parameters and the corresponding symbols.

In a further embodiment of the transceiver, the circuitry is configured to cancel interference from at least one of a baseband signal received by the antenna or a radiofrequency signal received by the antenna.

In a further embodiment, the transceiver includes receive circuitry configured to convert the analog signals to digital signals after canceling the interference from the analog signals.

In a further embodiment of the transceiver, the receive circuitry is configured to provide feedback based upon the digital signals to the adaptive interference logic and the adaptive interference logic is configured to estimate the interference parameters based upon the feedback.

In a further embodiment, the transceiver includes transmit circuitry configured to pre-code the plurality of symbols for transmission over the air interface concurrently with the adaptive interference logic canceling interference from the analog signals received by the antenna on the plurality of subcarriers.

In a further embodiment of the transceiver, the transmit circuitry is configured to transmit the plurality of symbols in full-duplex mode and wherein the receive circuitry is configured to concurrently receive uplink signals from the plurality of users transmitting in full-duplex mode.

In a further embodiment of the transceiver, the transmit circuitry is configured to transmit the plurality of symbols in full-duplex mode and wherein the receive circuitry is configured to concurrently receive uplink signals from subsets of the plurality of users transmitting in half-duplex mode.

In a further embodiment of the transceiver, the transceiver is configured to schedule the subsets of users for reception or transmission in half-duplex mode based on estimates of at least one of inter-user interference or locations of the users.

In yet another embodiment, a system is provided for interference cancellation. One embodiment of the system includes a plurality of transceivers. Each of the plurality of transceivers is configured to be communicatively coupled to one of a plurality of antennas in an antenna array. Each transceiver includes adaptive interference logic configured to estimate interference parameters using analog signals received at the antenna on each of a plurality of subcarriers. Each interference parameter is associated with one of a plurality of symbols transmitted to one of a plurality of users on one of the plurality of subcarriers. The system also includes circuitry configured to cancel interference from analog signals received by the antenna on the plurality of subcarriers using the estimated interference parameters.

In yet another embodiment, an apparatus for interference cancellation is provided. One embodiment of the apparatus includes means for estimating, for an antenna in an antenna array comprising a plurality of antennas, interference parameters using analog signals received at the antenna on each of a plurality of subcarriers. Each interference parameter is associated with one of a plurality of symbols transmitted to one of a plurality of users on one of the plurality of subcarriers. This embodiment of the apparatus includes means for canceling interference from analog signals received by the antenna on the plurality of subcarriers using the estimated interference parameters.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
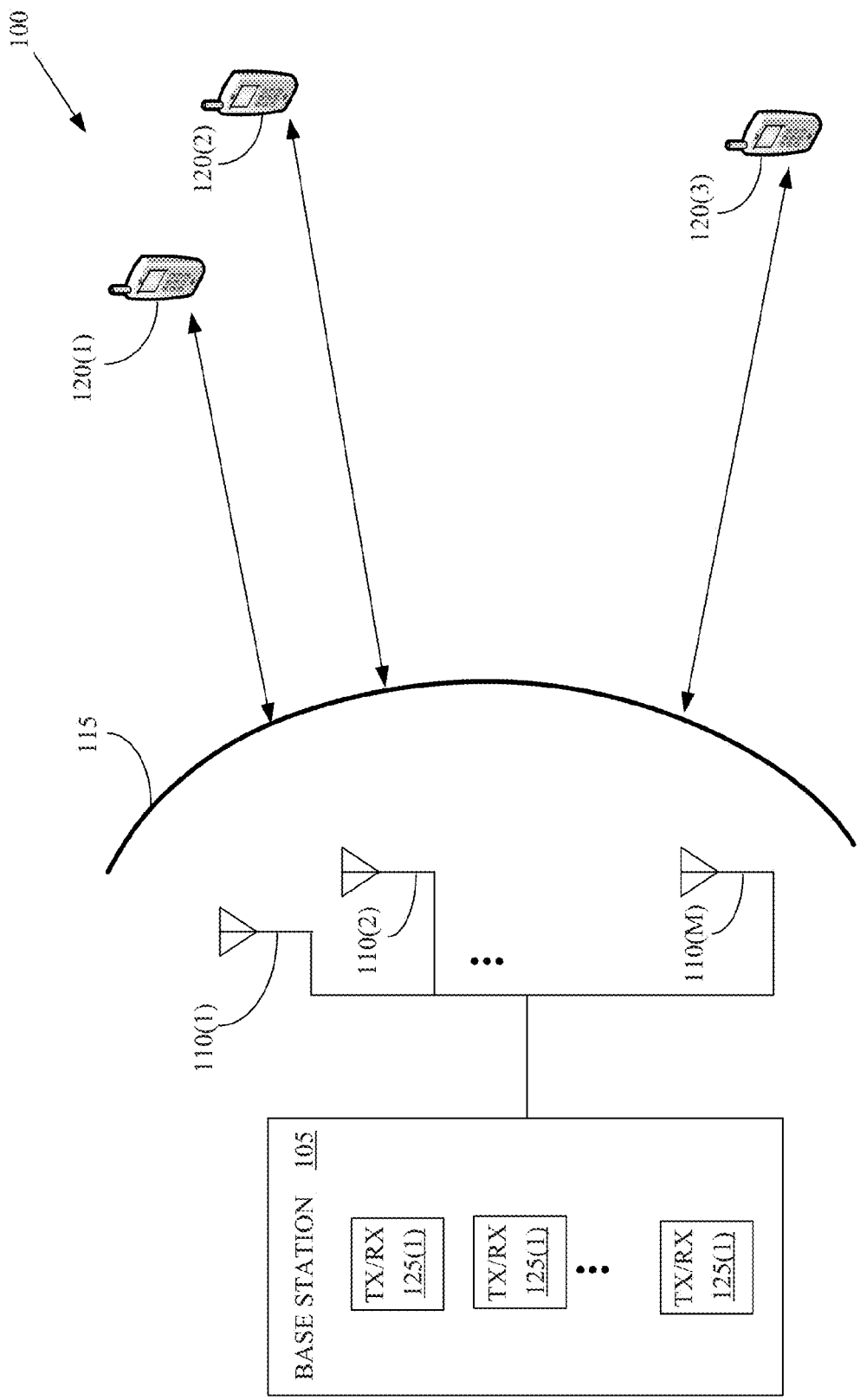
FIG. 1 conceptually illustrates an exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes techniques that can be used to cancel or at least reduce interference between transmitting antennas of a base station to improve the ability of these base stations to concurrently transmit and receive signals. Base stations transmit at a significantly higher power than mobile units. Consequently, the signal strength at a base station antenna may be dominated by energy radiated by the antennas. This energy may result in interference that may be referred to as self-interference or inter-antenna interference. The base station may therefore be unable to detect the energy transmitted by the mobile units when mobile units are transmitting uplink signals at the same time that the base station is transmitting downlink signals. Furthermore, even if the base station can detect the uplink transmissions, the accuracy of the energy estimation may be degraded by converting the analog signals to digital signals. For example, conventional transceivers use 12 bits to represent the received signal in digital form. Most, if not all, of the available bits may be used to represent interference when the inter-antenna interference levels are much higher than the uplink signal strength. Consequently, the number of bits available to represent the uplink signal is reduced, which results in a corresponding reduction in the accuracy of the representation of the uplink signal strength. This may make it difficult or impossible to detect the uplink signals concurrently with downlink signals, thereby forcing system designers to implement half duplex (e.g., time division duplex) communication schemes.

Interference cancellation can be used to remove the inter-antenna interference and thereby enable full-duplex communication. For example, interference cancellation may be performed for one of the M antennas attached to a base station by inverting the M−1 radiofrequency analog signals received by the other antennas. Appropriate delays and attenuations must be determined and applied to accurately represent the channel between the M−1 channels of the other antennas and the current antenna. In total, these calculations require estimating on the order of 2M−2 parameters for each antenna. This interference cancellation technique is not distributed because each antenna needs to gather information from the other antennas. Furthermore, this interference cancellation technique does not scale well with increasing number of antennas (M) because the number of operations scales as $M^2$.

The present application therefore describes alternate embodiments of interference cancellation techniques that have better scaling properties at least in part because the number of calculations performed at each antenna may be independent of the number of other antennas in the antenna array. In one embodiment, the received uplink signal strength for signals received at each antenna on each subcarrier may be used to estimate the interference parameter associated with the subcarrier that represent the combined channel effects between the rest of the antennas in the antenna array and the antenna of interest. The estimated interference parameters may then be applied to modulated symbols to generate an analog correction signal that represents the inter-antenna interference at the antenna of interest. The inter-antenna interference may include components from each of the other antennas in the array, as well as self-interference from the antenna of interest. The modulated symbols may also be pre-coded so that they can be concurrently transmitted over the air interface. The analog correction signal can then be used to remove interference from an analog uplink signal received at the antenna of interest. In different embodiments, the analog correction signal can be a baseband signal or a radiofrequency signal. Embodiments of the techniques described herein may be particularly useful in systems in which the antenna array includes a large number of antennas that are used to provide wireless connectivity to a much smaller number of wireless terminals.

FIG. 1 conceptually illustrates an exemplary embodiment of a wireless communication system 100. The wireless communication system 100 may operate according to agreed-upon standards and/or protocols including, but not limited to, the standards and/or protocols established by the Third Generation Partnership Project (3GPP, 3GPP2). In the illustrated embodiment, the wireless communication system 100 includes one or more base stations 105 that use a plurality of antennas 110(1-M) to communicate over an air interface 115 with multiple wireless-enabled terminals 120(1-K). Wireless-enabled terminals may include mobile devices such as mobile phones, smart phones, tablet computers, and laptop computers, as well as less mobile or immobile devices such as desktop computers. Wireless-enabled terminals may also include other devices such as monitors or sensors for transmitting measurement results, radiofrequency identifying tags, and the like. The number of antennas 110 may be larger than the number of wireless-enabled terminals 120 so that M>>K. Different embodiments of the wireless communication system 100 may implement different types of beamforming to support communication with the wireless-enable terminals 120. Furthermore, in alternative embodiments, the wireless communication system 100 may include other wireless access devices such as base station routers, access points, macrocells, microcells, femtocells, picocells, and the like. These alternative devices may also include multiple antennas and may be used in combination with or instead of the base stations 105 in other embodiments.

In one embodiment, the wireless communication system 100 implements a multi-user beamforming technique such as zero-forcing beamforming Multiuser beamforming is a sub-optimal, simplified version of the multiuser MIMO technology. On the uplink, different autonomous terminals 120 may transmit data in the same time/frequency slots and the base station 105 may utilize its channel knowledge to extract the individual data streams. On the downlink, the base station 105 may pre-code data streams based on its knowledge of channel state information (CSI) between the antennas 110 and the terminals 120 so that each terminal 120 can correctly decode its own data stream. Multiuser beamforming is considered to be more computationally tractable than the capacity-optimal multiuser MIMO solutions that may implement relatively complicated pre-coding methods such as dirty-paper coding. However, multiuser beamforming is not capacity-optimal. Zero-forcing beamforming employs linear pre-coding to create a transmission vector, s, by multiplying the K×1 vector of data-bearing symbols, q, by an M×K matrix A, s=Aq. In zero-forcing beamforming, the matrix A is defined as:

$$A = c \cdot G^* (G^T G^*)^{-1}, \quad (2)$$

Where G is the M×K channel matrix, c is a constant chosen to satisfy a power constraint, and the superscript "*" denotes the complex conjugate of the matrix. Zero-forcing beamforming can keep inter-terminal interference close to zero if K≤M.

Zero-forcing beamforming can be approximated by conjugate beamforming in embodiments where M/K→∞, $G^T G^* \sim I_K$ (the identity matrix). In conjugate beamforming, the matrix A is simplified to:

$$A = c \cdot G^* \quad (3)$$

In other words, the problem of computing the matrix A is considerably simplified when the number of base station antennas is much larger than the number of terminals. The success of conjugate beamforming depends on the columns of the propagation matrix, G, becoming asymptotically orthogonal for M/K>>1. Asymptotic orthogonality may be achieved if there is line of sight propagation and the terminals 120 are randomly distributed in angle around the base station 105. Asymptotic orthogonality may also be achieved if the terminals 120 are deployed in a dense scattering environment. Either pre-coder may fail if the propagation matrix is inherently low-rank. The pseudo-inverse may be more difficult to compute but under some circumstances it may perform better than conjugate beamforming.

The base station 105 may utilize the array of antennas 110 to provide concurrent service to the K terminals 120, e.g., by transmitting symbols to the different terminals 120 concurrently within a single time slot or a plurality of sequential, non-sequential, interleaved, or consecutive time slots. The duration of each slot may be defined so that no one or nothing moves more than a quarter-wavelength for the duration of the slot. In one embodiment, the K terminals 120 may be a subset of a larger group of terminals that are served by the base station 105. Different subsets of terminals 120 can be served by the base station 105 in the conventional single-user communication scheme. In some embodiments, communication with one subset of terminals 120 can be orthogonal to communication with another subset of terminals 120.

Each terminal 120 can transmit a pilot signal over the uplink and reception of the pilot sequences by the service array 110 enables the wireless communication system 100 to estimate the up-link channel. Moreover, by virtue of time division duplex (TDD) reciprocity, the down-link channels may also be estimated using the pilot sequences received at the antennas 110 from the terminals 120. The channel-state information (CSI) may enable the base station 105 to distinguish the individual quadrature amplitude modulated (QAM) sequences on the up-link and to perform pre-coding on the down-link such that the terminals 120 only receive their respective QAM sequence. In one embodiment, the up-link pilots for active terminals 120 may be scheduled periodically.

The wireless communication system 200 includes functionality to perform inter-antenna interference cancellation so that the interference created when the antennas 110 are transmitting can be removed. In one embodiment, the interference cancellation may allow the base station 105 to detect uplink signals transmitted by one or more of the terminals 120. The wireless communication system 200 may therefore support full-duplex communication. For example, the base station 105 and the terminals 120 may be able to transmit and receive uplink and downlink signals concurrently. In alternative embodiments discussed herein, the base station 105 may operate in a full-duplex mode so that the base station 105 is concurrently transmitting downlink signals and receiving uplink signals while some or all of the terminals 120 operate in a half-duplex mode so that the half-duplex terminals 120 transmit uplink signals and receive downlink signals in mutually exclusive time intervals. In one embodiment, interference cancellation is performed in transceivers (TX/RX) 125 (1-M) that are each connected to a corresponding antenna 110.

Figure 2:
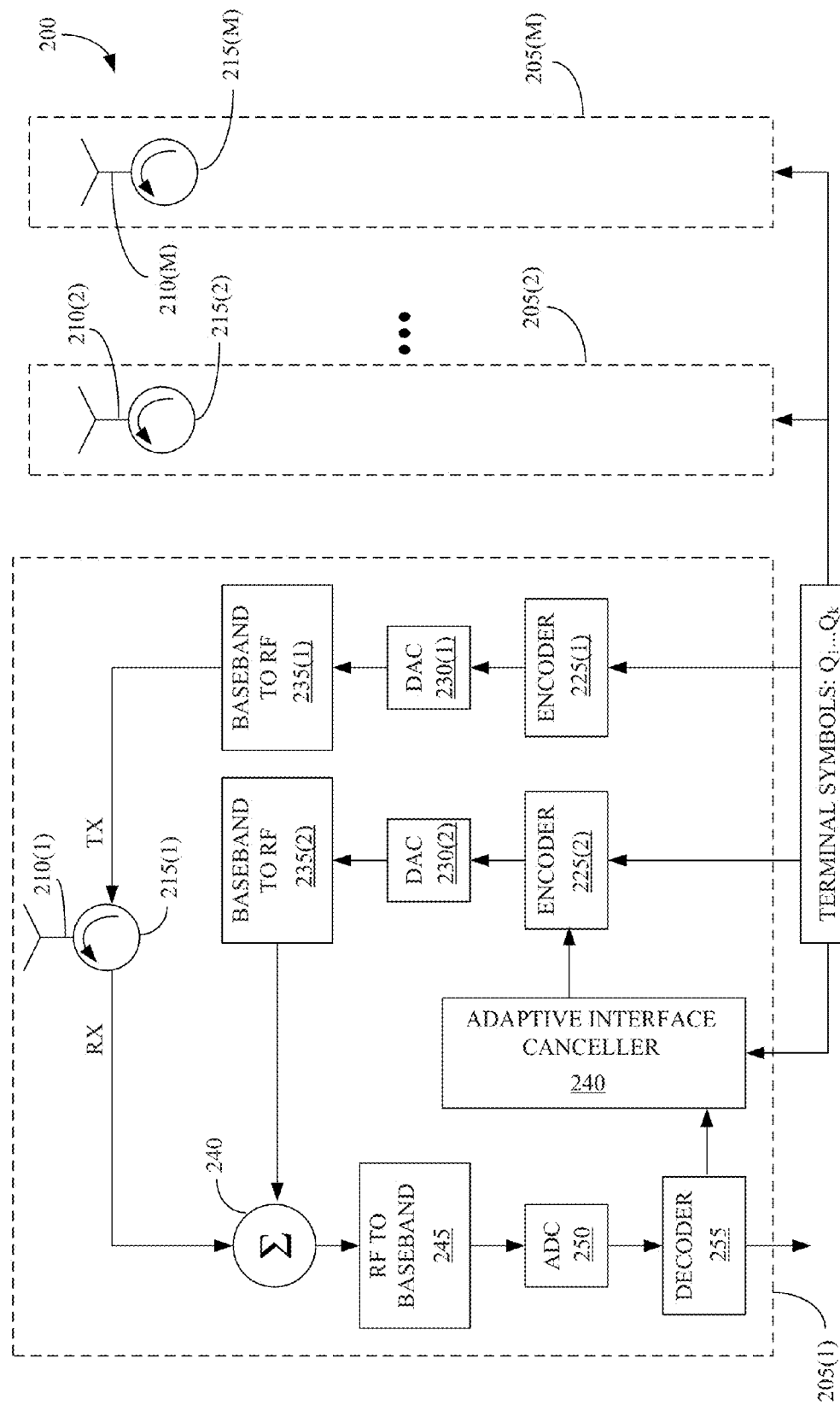
FIG. 2 conceptually illustrates an exemplary embodiment of a full-duplex transceiver.

FIG. 2 conceptually illustrates an exemplary embodiment of a full-duplex transceiver 200. In the illustrated embodiment, the full-duplex transceiver 200 includes a plurality of full-duplex transceiver elements 205(1-M) that each includes an antenna 210 that is connected to transceiver circuitry using a circulator 215. Alternative embodiments may use other elements such as filters or other duplexers to couple the transceiver circuitry to the antenna 210. The full-duplex transceiver 200 may be used to provide wireless connectivity to K user equipment or wireless-enabled terminals over an uplink and downlink. For example, during one transmission interval the full-duplex transceiver 200 may be configured to transmit symbols ($Q_1, \ldots, Q_K$) 220 to the corresponding K terminals. The symbols 220 may therefore be provided to the transceiver elements 205 for encoding, modulation, pre-coding and transmission over the air interface to the terminals. In one embodiment, the number of antennas is larger than the number of terminals so that M>>K. However, persons of ordinary skill in the art having benefit of the present disclosure should appreciate that any number of antennas and/or terminals may be present.

The transceiver circuitry is illustrated in more detail for the transceiver element 205(1). In the interest of clarity, this detail is omitted from the other transceivers 205(2-K). In the illustrated embodiment, digital signals that represent the symbols 220 are provided to different portions of the transceiver element 205(1). One copy or version of the symbols 220 is provided to an encoder 225(1) that is in a transmit branch of the transceiver element 205(1). The encoder 225(1) may encode the received digital symbols and then forward the encoded symbols to a digital-to-analog converter (DAC) 230 (1) for conversion to an analog baseband signal. The analog baseband signal may then be converted to a radiofrequency signal by an appropriate converter 235(1) and the radiofrequency signal may be provided to the circulator 215(1) and the antenna 210(1) for transmission over the air interface.

Another copy or version of the digital symbols 220 may be provided to an adaptive interference canceler 240. The adaptive interference canceler 240 may use the signal energy received by the antenna 210(1) to estimate correction factors that are representative of the inter-antenna interference received by the antenna 210(1). In the illustrated embodiment, the number of correction factors used by the antenna 210(1) for interference cancellation scales with the number (K) of terminals and is independent of the number of other antennas 210(2-M). Moreover, in the illustrated embodiment, the information used to estimate the interference parameters is available in the transceiver element 205(1) and the adaptive interference canceler 240 may therefore not need to gather information from the other transceiver elements 205(2-M). The correction factors generated by the adaptive interference canceler 240 may then be provided to an interference cancellation branch of the transceiver elements 205(1).

A third copy or version of the symbols 220 may be provided to encoder 225(2) that is in the interference cancellation branch of the transceiver element 205(1). The encoder 225(2) may use the provided correction factors to modify the digital representation of the symbols 220 so that the modified symbols approximate the inter-antenna interference generated at the antenna 210(1) when the symbols are transmitted by the antennas 210. After the digital symbols 220 have been modified by applying the correction factors, the encoder 225(2) may encode the modified digital symbols and then forward the encoded symbols to a digital-to-analog converter (DAC) 230(2) for conversion to an analog baseband signal. The analog baseband signal may then be converted to a radiofrequency signal by an appropriate converter 235(2).

The radiofrequency signal generated in the interference cancellation branch of the transceiver element 205(1) may be provided to the receive branch of the transceiver element 205(1) and used to cancel inter-antenna interference generated by transmission from the antennas 210(1-M). In the illustrated embodiment, the radiofrequency signal is provided to a summer 242, which also receives the radiofrequency signals received by the antenna 210(1). The summer 242 may therefore be used to cancel interference from the received radiofrequency signals by combining the received radiofrequency signal with the radiofrequency signal generated in the interference cancellation branch. For example, the received radiofrequency signal may be combined or summed with a negated or inverted version of the radiofrequency signal to subtract an estimated version of the radiofrequency signals received from the antennas 210(1-K). Thus, in the illustrated embodiment, the correction factors are estimated in the digital domain and cancellation is performed in the analog domain. However, alternative embodiments may use other circuitry to estimate the correction factors in the analog domain.

Following interference cancellation, the remaining received radiofrequency signal may be provided to a converter 245 for converting the radiofrequency signal to a baseband signal. The analog baseband signal is then provided to an analog-to-digital converter (ADC) 250 to generate a digital representation of the baseband signal, which is then provided to a decoder 250 for decoding the received signal. In one embodiment, feedback from the decoder 250 can be provided to the adaptive interference canceler 240 so that the adaptive interference canceler 240 can further refine estimates of the correction factors.

Figure 3A:
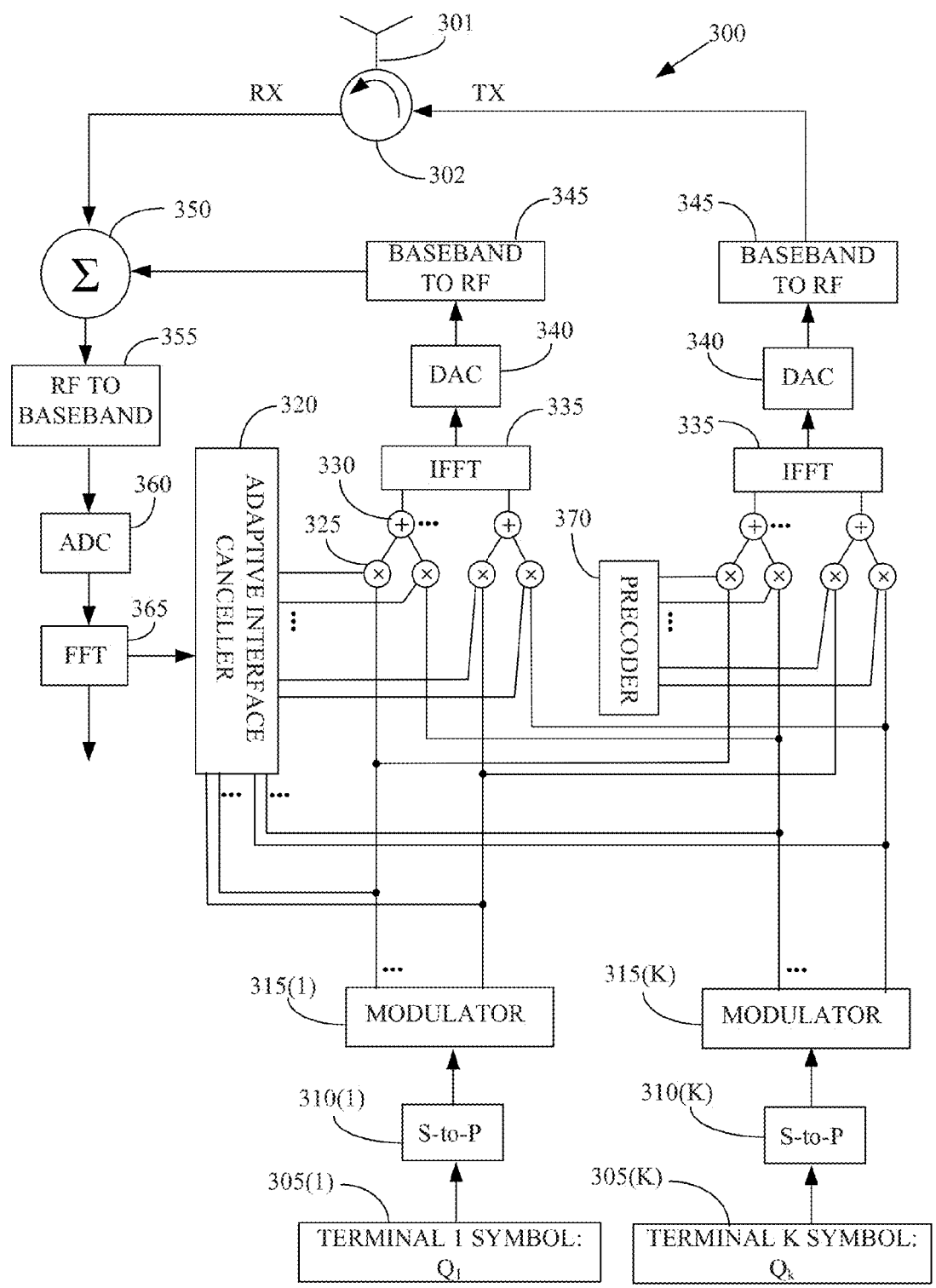
FIG. 3A conceptually illustrates a first exemplary embodiment of a full-duplex transceiver element.

FIG. 3A conceptually illustrates a first exemplary embodiment of a full-duplex transceiver element 300. In the illustrated embodiment, the full-duplex transceiver element 300 operates according to orthogonal frequency division multiplexing (OFDM) and can therefore be used to transmit signals on a plurality of orthogonal subcarriers. The transceiver element 300 includes an antenna 301 that is connected to transceiver circuitry using a circulator 302. The transceiver element 300 may be one of a plurality of transceiver elements that are implemented in a base station, such as the base station 105 shown in FIG. 1, or in a full-duplex transceiver such as the transceiver 200 shown in FIG. 2. In the illustrated embodiment, the transceiver element 300 is used to transmit symbols 305(1-K) to a corresponding number (K) of user equipment or wireless-enabled terminals. In the illustrated embodiment, the transceiver element 300 is one of M base station antennas that may be used to transmit to the K wireless-enabled terminals. Each of the wireless-enabled terminals is assumed to have a single antenna but persons of ordinary skill in the art having benefit of the present disclosure should appreciate that alternative embodiments may provide wireless connectivity to wireless-enabled terminals that have more than one antenna.

In operation, digital representations of each of the symbols are provided to a serial-to-parallel converter 310 and then to a modulator 315 to modulate the symbols using an appropriate scheme and map the modulated symbols ($q_{k,f}$) to the subcarriers, f=1, 2 ..., F. In one embodiment, each symbol $q_{k,f}$ can be the QAM symbol for a terminal k (where $1 \leq k \leq K$) that is mapped to subcarrier f. Digital representations of the modulated symbols $q_{k,f}$ may be provided to an adaptive interference canceler 320. Interference created by the M−1 antennas and signal leakage from the transmit chain of the transceiver element 300 to the receive chain of the transceiver element 300 may be represented by a linear combination of the symbols $q_{k,f}$ that are transmitted to the K terminals. The sequence of symbols for terminals 1-K is $Q_1$-$Q_K$ in the illustrated embodiment. For a given subcarrier f and antenna m, the interference signal can be written as follows.

$$y_{I,m,f} = \Sigma_{k=1}^{K} a_{m,k,f} q_{k,f} \qquad (4)$$

where in equation (4) $q_{1f}$-$q_{Kf}$ are the symbols to be transmitted to terminals 1, 2, ..., K respectively. Each of the symbols $q_{1f}$-$q_{Kf}$ is mapped to subcarrier f. The received signal at a particular antenna $y_{mf}$ on subcarrier f is the sum of the received signal $y_{u,mf}$ from L terminals in the uplink and the self-interference $y_{I,mf}$. Thus, $$y_{u,mf} = y_{mf} - \Sigma_{k=1}^{K} a_{mkf} q_{kf} \quad (5)$$

In the illustrated embodiment, the value of $y_{u,mf}$ may be estimated by estimating the set of parameters $a_{mkf}$. For example, the values of the set of parameters $a_{mkf}$ may be estimated by minimizing:

$$\min |y_{mf} - \Sigma_{k=1}^{K} a_{mkf} q_{kf}|^2. \quad (6)$$

This minimization may be used to generate the values of the set of parameters $a_{mkf}$ because the transmitted signal and received signal are not correlated. For example, equation (6) may be solved using a least-min-square estimation method. As discussed herein, in some embodiments an adaptive procedure can be used to fine-tune the precision using a feedback control mechanism based on feedback received from the receive chain.

In the illustrated embodiment, the adaptive interference canceler 320 estimates K interference parameters $a_{mkf}$ for each subcarrier f. The adaptive interference canceler 320 may perform the calculation adaptively based on the feedback from the residual signal after cancellation is done on the received signal. The interference parameters $a_{mkf}$ for each subcarrier may then be combined with the modulated symbols $q_{1f}$, $q_{2f}$, ..., $q_{Kf}$, e.g., using multipliers 325 (only one indicated by a numeral in FIG. 3) to generate modified modulated symbols for each subcarrier (f) and user (k). The modified modulated symbols for each subcarrier may be combined, e.g., using adders 330 (only one indicated by a numeral in FIG. 3). The combined symbols may be provided to an inverse fast Fourier transform element (IFFT) 335 and then to a digital to analog converter 340 for conversion to the analog domain. The resulting analog baseband signal may be converted to a radiofrequency signal using a baseband to radiofrequency converter 345.

The radiofrequency signal generated by the converter 345 may approximate the inter-antenna interference signal received by the antenna 301. The signal may therefore be used to cancel inter-antenna interference from signals received by the antenna 301. In the illustrated embodiment, the radiofrequency signal is provided to a summer 350, which also receives the radiofrequency signals received by the antenna 301. The summer 350 may therefore be used to cancel interference from the received radiofrequency signals by combining the received radiofrequency signal with the radiofrequency signal generated in the interference cancellation branch. For example, the receive radiofrequency signal may be combined or summed with a negated or inverted version of the radiofrequency signal to subtract an estimated version of the radiofrequency signals received from the antenna 301 and other antennas in the antenna array. Thus, in the illustrated embodiment, the correction factors are estimated in the digital domain and interference cancellation is performed in the analog domain. However, alternative embodiments may use other circuitry to estimate the correction factors in the analog domain.

Following interference cancellation, the remaining received radiofrequency signal may be provided to a converter 355 for converting the radiofrequency signal to a baseband signal. The analog baseband signal is then provided to an analog-to-digital converter (ADC) 360 to generate a digital representation of the baseband signal, which is then provided to a fast Fourier transform element (FFT) 365. In one embodiment, feedback from the FFT 365 can be provided to the adaptive interference canceler 320 so that the adaptive interference canceler 320 can further refine estimates of the correction factors. For example, the feedback may include signals representative of pilot signals or other signals and the feedback may therefore be used by the adaptive interference canceler 320 to estimate and/or account for multipath effects, e.g., due to scattering in the environment between the antenna 301 and one or more of the wireless-enabled terminals.

In the illustrated embodiment, digital representations of the modulated symbols $q_{kf}$ may also be provided to a transmission branch of the transceiver 300. The transmission branch includes a pre-coder 370 that is used to generate a precoding matrix that can be used to precode the modulated symbols $q_{kf}$. The pre-coding matrices $h_{mkf}$ for each subcarrier may then be combined with the modulated symbols $q_{1f}$-$q_{Kf}$, e.g., using multipliers 325 (only one indicated by a numeral in FIG. 3) to generate modified modulated symbols for each subcarrier (f) and user (k). The modified modulated symbols for each subcarrier may be combined, e.g., using adders 330 (only one indicated by a numeral in FIG. 3). The combined symbols may be provided to an inverse fast Fourier transform element (IFFT) 335 and then to a digital to analog converter 340 for conversion to the analog domain. The resulting analog baseband signal may be converted to a radiofrequency signal using a baseband to radiofrequency converter 345 and the radiofrequency signal may be conveyed to the antenna 301 via the circulator 302. In the illustrated embodiment, the transceiver 300 may therefore be used in full-duplex mode so that downlink symbols can be transmitted to one or more users using the transmit chain concurrently with reception of uplink signals from one or more users.

Figure 3B:
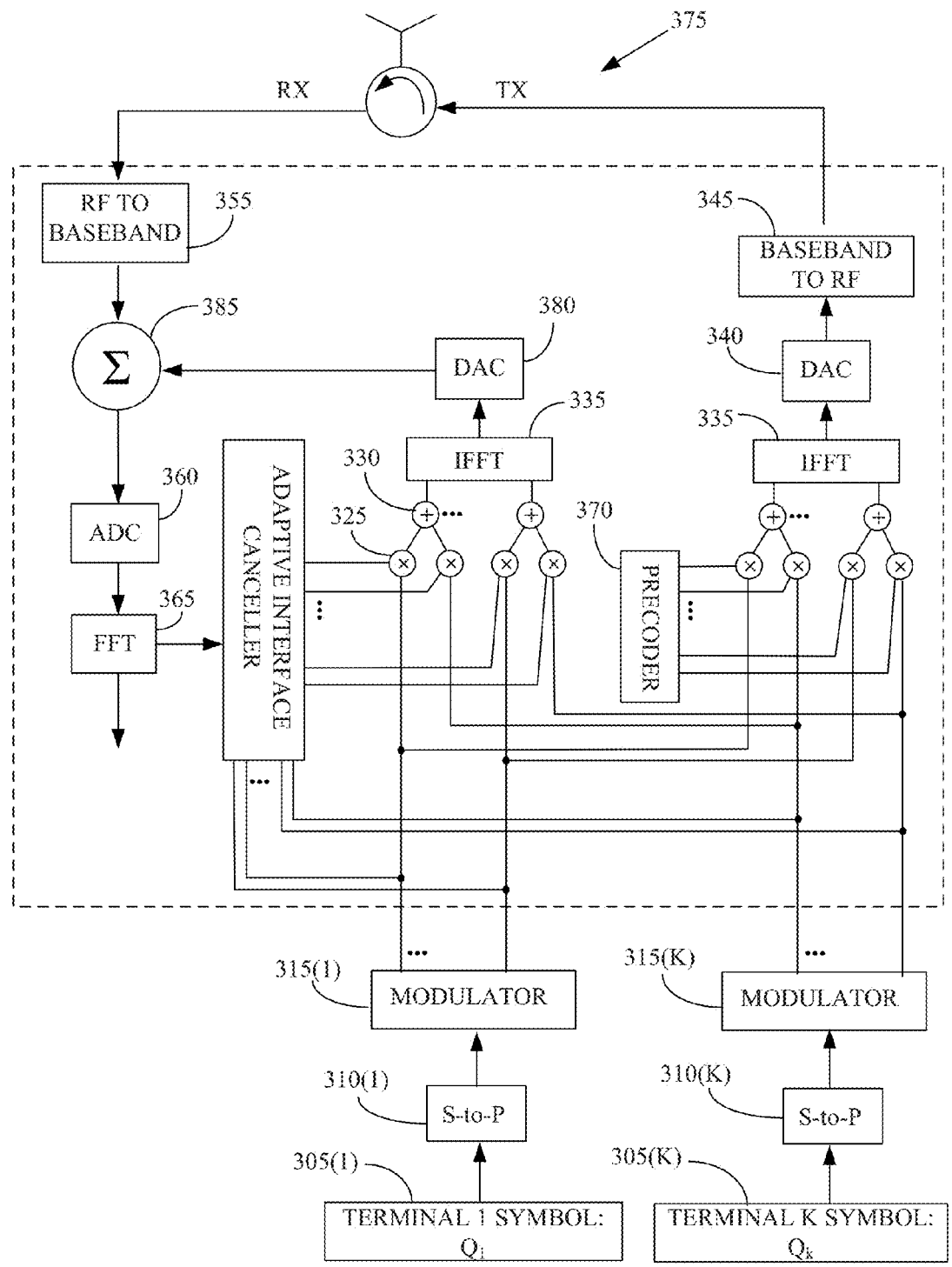
FIG. 3B conceptually illustrates a second exemplary embodiment of a full-duplex transceiver element.

FIG. 3B conceptually illustrates a second exemplary embodiment of a full-duplex transceiver element 375. In the illustrated embodiment, the full-duplex transceiver element 375 operates according to orthogonal frequency division multiplexing (OFDM) and can therefore be used to transmit signals on a plurality of orthogonal subcarriers. The transceiver element 375 shares many of the same elements with the first exemplary embodiment of the transceiver element 300 but the second exemplary embodiment of the transceiver element 375 uses an alternate interference cancellation path that differs from the interference cancellation path used by the first exemplary embodiment of the transceiver element 300. In the interest of clarity, the shared functional elements are indicated by the same numerals and may function in the same manner as the corresponding elements in the first exemplary embodiment of the transceiver element 300. However, persons of ordinary skill in the art having benefit of the present disclosure should appreciate that alternative embodiments may use different combinations of functional elements to implement different embodiments of the techniques described herein.

As discussed herein with regard to the first exemplary embodiment, digital representations of each of the symbols 305 are provided to a serial-to-parallel converter 310 and then to a modulator 315 to modulate the symbols using an appropriate scheme and map the modulated symbols ($q_{kf}$) to the subcarriers, f=1, 2, ..., F. Copies or versions of the digital representations may be provided to the transmit branch, the receive branch, and the adaptive interference cancellation branch of the transceiver 375. In the illustrated embodiment, the adaptive interference canceler 320 estimates K interference parameters $a_{mkf}$ for each subcarrier f. The adaptive interference canceler 320 may perform the calculation adaptively based on the feedback from the residual signal after cancellation is done on the received signal. The interference parameters $a_{mkf}$ for each subcarrier may then be combined with the modulated symbols $q_{1f}$-$q_{Kf}$, e.g., using multipliers 325 to generate modified modulated symbols for each subcarrier (f) and user (k). The modified modulated symbols for each subcarrier may be combined, e.g., using adders 330. The combined symbols may be provided to an inverse fast Fourier transform element (IFFT) 335 and then to a digital to analog converter 380 for conversion to the analog domain to form an analog baseband signal. The DAC 380 differs from the DAC 320 shown in the first exemplary embodiment of the transceiver element 300 because signals from the DAC 380 are provided directly to the receive branch of the second exemplary embodiment of the transceiver element 375. The structure of the DAC 380 may therefore differ from the structure of the DAC 320. In the illustrated embodiment, the interference cancellation path does not include a baseband to radiofrequency converter.

The analog baseband signal generated by the DAC 380 may approximate the inter-antenna interference signal produced by the radiofrequency to baseband converter 355 using radiofrequency signals received by the antenna 301. The analog baseband signal may therefore be used to cancel inter-antenna interference from signals received by the antenna 301. In the illustrated embodiment, the analog baseband signal is provided to a summer 385, which also receives the analog baseband signals produced by the radiofrequency to baseband converter 355. The summer 385 may therefore be used to cancel interference from the received analog baseband signals by combining the received analog baseband signal with the analog baseband signal generated in the interference cancellation branch. For example, the received analog baseband signal may be combined or summed with a negated or inverted version of the analog baseband signal to subtract an estimated version of the analog baseband signals produced by the converter 355. Thus, in the illustrated embodiment, the correction factors are estimated in the digital domain and interference cancellation is performed in the analog domain. However, alternative embodiments may use other circuitry to estimate the correction factors in the analog domain.

Following interference cancellation, the remaining received radiofrequency signal may be provided to a converter 355 for converting the radiofrequency signal to a baseband signal. The analog baseband signal is then provided to an analog-to-digital converter (ADC) 360 to generate a digital representation of the baseband signal, which is then provided to a fast Fourier transform element (FFT) 365. In one embodiment, feedback from the FFT 365 can be provided to the adaptive interference canceler 320 so that the adaptive interference canceler 320 can further refine estimates of the correction factors. For example, the feedback may include signals representative of pilot signals or other signals and the feedback may therefore be used by the adaptive interference canceler 320 to estimate and/or account for multipath effects, e.g., due to scattering in the environment between the antenna 301 and one or more of the wireless-enabled terminals.

In the illustrated embodiment, digital representations of the modulated symbols $q_{kf}$ may also be provided to a transmission branch of the transceiver 375. The transmission branch includes a pre-coder 370 that is used to generate a precoding matrix that can be used to precode the modulated symbols $q_{kf}$. The pre-coding matrices $h_{mkf}$ for each subcarrier may then be combined with the modulated symbols $q_{1f}$-$q_{Kf}$, e.g., using multipliers 325 to generate modified modulated symbols for each subcarrier (f) and user (k). The modified modulated symbols for each subcarrier may be combined, e.g., using adders 330. The combined symbols may be provided to an inverse fast Fourier transform element (IFFT) 335 and then to a digital to analog converter 340 for conversion to the analog domain. The resulting analog baseband signal may be converted to a radiofrequency signal using a baseband to radiofrequency converter 345 and the radiofrequency signal may be conveyed to the antenna 301 via the circulator 302. In the illustrated embodiment, the transceiver 375 may therefore be used in full-duplex mode so that downlink symbols can be transmitted to one or more users using the transmit chain concurrently with reception of uplink signals from one or more users.

Embodiments of the design depicted in FIGS. 3A-3B can be implemented in a distributed fashion because $q_{kf}$ is known at a given antenna m. Consequently, embodiments of the design depicted in FIGS. 3A-3B may work well within a conjugate beamforming framework. In the illustrated embodiment, the adaptive interference canceler 320 determines $a_{mkf}$ in the digital domain; but the cancellation is done in the analog domain. In alternative embodiments, analog circuitry may be used to estimate $a_{mkf}$ in the analog domain. Furthermore, in the illustrated embodiment, a single RF analog signal is used to cancel interference in the received chain. This design is consequently very scalable. In the interest of clarity, elements of the transceivers 300, 375 that are not relevant to the claimed subject matter are not depicted in FIGS. 3A-3B. For example, a parallel to serial converter may be implemented between the DAC and the IFFT. For another example, a cyclic prefix insertion component may be included in the transceiver elements 300, 375.

Embodiments of the design depicted in FIGS. 3A-3B may have a number of advantages over the conventional practice. For example, conventional interference cancellation techniques need to invert M−1 radiofrequency analog signals and then apply the appropriate delay and attenuation to represent or estimate the channel between M−1 antennas and the antenna in consideration. To obtain the delay and attenuation, the channel between M−1 antennas and the antenna m in consideration must be estimated. In addition, the wired channel between the M−1 radiofrequency analog signal and the summer or interference canceler that is used for cancellation must be estimated to a good degree of accuracy. Note that antenna m also needs to know the transmitted signal from each of the M−1 antennas. Consequently, the conventional approach is not a distributed design. Moreover, at least 2M−2 parameters need to be estimated in the conventional approach, where his in embodiments of the techniques described herein only estimate K interference parameters for each subcarrier. Furthermore, the conventional approach requires M−1 analog signal inverters (e.g., baluns).

For traditional cellular transmission, the maximum power of a transmitted signal can be 80 to 120 dB higher than the minimum strength of the received signal. For example, thermal noise is −174 dBm per Hz. For a 10 MHz channel, the thermal noise power is −104 dBm. There may also be up to 3 dB additional noise. If the signal has to be 10 dB higher than noise, the minimal signal power for decoding will be −91 dBm. For a conventional base station, the transmitted power can be 20 W. There can be a 10 dB attenuation between each of the M−1 antennas and the antenna m in consideration. The received signal power would therefore be around 33 dBm and so the cancellation gain must be greater than 33+91=124 dB. Let $P_{ref}$ be the reference power of traditional base station, e.g. 20 W.

In contrast, the total power of a base station that implements an antenna array having a large number of antennas may be $P_{tt}=P_{ref}/M$. In one embodiment, each antenna's power is $P_{ant}=P_{ref}/M^2$. The received signal at antenna m from the other M−1 antenna's transmission to K terminals may then be:

$$y_{I,mf} = \Sigma_{l=1,l\neq m}^M h_{mlf} s_{lf} \tag{7}$$

where $h_{mlf}$ is the channel between the base station antennas m and l for subcarrier f, and $s_{lf}$ is the transmitted signal of antenna/at subcarrier f. The transmitted signal may be given by:

$$s_{lf} = \sqrt{\frac{P_{ref}}{M^2}} \sum_{k=1}^{K} h_{lkf}^* q_{kf} \tag{8}$$

In these formula, $h_{lkf}$ is the channel between the base station antenna/and terminal k at subcarrier f and $q_{kf}$ is the symbol for terminal k. The received self-interference signal may then be given by:

$$y_{lf} = \sqrt{\frac{P_{ref}}{M^2}} \sum_{k=1}^{K} \left( \sum_{l=1,l\neq m}^{M} g_{mlf} h_{lk}^* \right) q_{kf}. \tag{8}$$

since the contributions $$\Sigma_{k=1}^K (\Sigma_{l=1,l\neq m}^M g_{mlf} h^*_{lkf}) \tag{9}$$

to the received self-interference signal do not add coherently, the self-interference signal grows proportionally to the square root of M. Thus, the total received self-interference power is $P_{ref}/M$. If the number of antennas M=100, the antenna array may provide a 20 dB gain over traditional base stations. The gain achieved by the antenna array increases with the number of antennas and, in one embodiment, the multiple antenna system described herein may achieve an additional gain of 10 log M.

Embodiments of the techniques described herein use adaptive interference cancellation to cancel self-interference in the analog domain. In some embodiments, the interference cancellation scheme may handle multiple path residual self-interference by performing additional digital cancellation. Together, analog cancellation and digital cancellation can achieve 70 dB gain. If M=100, there may be an additional gain of 20 dB that results from using a large number of antennas and an antenna array. Thus, embodiments of the systems described herein may achieve a gain of 90 dB. One advantage of embodiments of the techniques described herein is that the gains increase with the increase of the number of antennas. Required gains can therefore be achieved by implementing a sufficient number of antennas in the antenna array. Moreover, there may be two other sources of additional gains that may be realized using alternative embodiments of the techniques described herein. First, if terminal transmission powers do not scale proportionally with respect to the number of antennas, the received signal power from terminals relative to the signal after analog cancellation may be much higher when an antenna array with a large number of antennas is used. Consequently, digital cancellation may provide additional gains. Second, better antenna separation can be achieved, e.g. by shielding the antennas using metals or by using directional antennas. In one embodiment, the additional gains from these techniques can make up for the gap of 30 dB.

Figure 4:
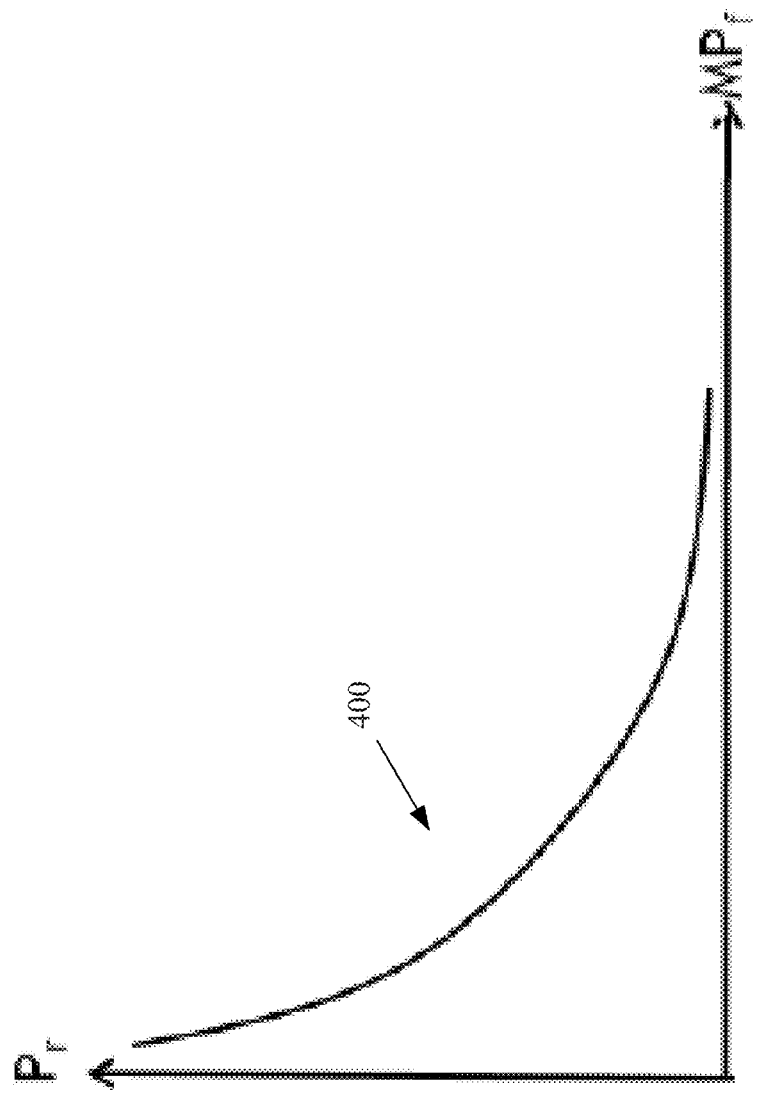
FIG. 4 illustrates the total signal-to-noise ratio as a function of the reverse link pilot power ($P_r$) and $MP_f$, where $P_f$ is the forward link antenna transmission power and M is the number of antennas.

In the illustrated embodiment, the antenna array uses a reverse link pilot, e.g., for channel estimation. As shown in FIG. 4, the total signal-to-noise ratio (SNR) 400 is proportional to $MP_rP_f$, where $P_r$ is the reverse link pilot power, $P_f$ is the forward link antenna transmission power, and M is the number of antennas. Because of this power constraint, in some embodiments an operating power may be chosen so that the multiple antenna gains can support full duplex transmission for both the base stations and the wireless-enabled terminals. However, in some cases, and operating point that supports full duplex transmission for all of the transmitting entities may not be available. If the optimal operating point does not exist for the particular embodiments, then some or all of the wireless-enabled terminals may have to operate half duplex. For example, the base station may continue to operate in full duplex so that it is concurrently transmitting downlink signals and receiving uplink signals from at least some of the wireless-enabled terminals. However, individual wireless-enabled terminals may have to operate in half duplex mode so that they are either transmitting uplink signals or receiving downlink signals from the base station.

If some or all of the wireless-enabled terminals operate at half duplex, one portion of the terminals will be transmitting and another portion of the terminals will be receiving at any given time. The base station can schedule the transmission by selecting the sender set and receiver set to minimize or reduce interference between sending terminals and receiving terminals. In one embodiment, scheduling of the half duplex wireless-enabled terminals may be facilitated using high level information such as the location of these terminals and/or the angle-of-arrival of signals from the terminals. For example, the base station may schedule packets for multiple users for transmission from the multiple antennas based on information indicating the locations of the multiple users or wireless-enabled terminals. This information can be obtained using uplink signals received at the multiple antennas. The relative delays between signals received at different antennas from a user can be used to determine an angle-of arrival of the signal. Packets for multiple users may therefore be scheduled based on the angular difference between the angle-of-arrivals of the signals from the different users. For another example, signal strengths of signals received at the antennas can be used to estimate distances from the base station to the users. Packets from multiple users may be scheduled based upon the differences between the distances. Furthermore, various functional combinations of the angle-of-arrival information, the distance information, and other location information may also be used to schedule the packets.

Referring back to FIG. 1, embodiments of the wireless communication system 100 may have a number of advantages over conventional systems. For example, a single cell approximation can be used to analyze the aggregate cell capacity of the antenna array 110. The illustrated embodiment of the base station 105 incorporates M antennas that serve K terminals 120 within one slot comprising T symbols. In the illustrated embodiment, the time slot is used for up-link pilot transmission and down-link data transmission. The duration of the orthogonal pilot sequences is t, where K≤t≤T. The propagation matrix comprises independent Rayleigh fading and the propagation coefficients are not known. The expected uplink signal-to-noise ratio (SNR) is denoted by $\rho_r$ and the expected down-link SNR is denoted by $\rho_f$. The SNR is defined herein with respect to a single antenna transmitting and a single antenna receiving. The instantaneous aggregate capacity (bits/symbol), C, can be shown to be lower bounded as:

$$C \geq K \cdot \log_2\left[1 + \frac{M}{K}\left(\frac{\rho_f}{1+\rho_f}\right)\left(\frac{\rho_r \tau}{1+\rho_r \tau}\right)\right] \quad (10)$$

The relationship in equation (10) shows that increasing M, or having more antennas 110, increases the capacity of the cell. A large M can therefore compensate for poor quality channel estimate, as measured by the product $\rho_r \tau$, as well as for reduced total transmitted power, as measured by $\rho_f$. On the other hand, increasing the number of concurrently serviced terminals, K, may not necessarily increase the cell capacity at least in part because the amount of time required to send up-link pilot signals is proportional to K.

The relationship in equation (10) also shows that incorporating numerous antennas 110, or a large M, allows the same aggregate capacity to be achieved with smaller total transmitted power ($\rho_f$), relative to systems that incorporate a smaller number of antennas (e.g., M≤4) or a single antenna. With very large M, the base station 105 can achieve higher aggregate capacity with total transmission power that is orders of magnitude lower than the total transmission power required for a conventional base station that incorporates a smaller number of antennas (e.g., M≤4). Moreover, a traditional base station antenna employs a high-output power amplifier to deliver the required transmission power of 20 to 40 Watt. The high-output power amplifier consumes very high power and requires cooling equipment that not only consumes extra power but also takes extra real estate. According to some conventional estimates, the cooling can contribute about 50% of the operational cost of a traditional base station. In contrast, we envision embodiments of the antenna array such as the antennas 110 may have much lower power requirements, e.g. several Watts or several tenths of a Watt. Consequently, the base station 105 and/or the antennas 110 may not require any cooling equipment and may have a much lower operational cost than a traditional base station serving a similar or even higher capacity.

Embodiments of the base station 105 and the antenna array 110 may also support a very useful tradeoff between spectrum and energy efficiencies. Using the down-link for example, the spectrum efficiency may be measured by the net aggregate throughput by including a factor that is equal to the fraction of time spent transmitting data, (1−t/T)·C. The down-link energy efficiency can be measured C/$\rho_f$. Therefore, by varying $\rho_f$, the base station 105 enables flexible tradeoff between down-link spectrum efficiency and energy efficiency. A similar tradeoff exists for up-link transmissions. This flexibility can be used to adapt to different loadings of the cell. For example, spectrum efficiency is preferred in a highly loaded period of a cell and energy efficiency is preferred during a lightly loaded period.

Figure 5:
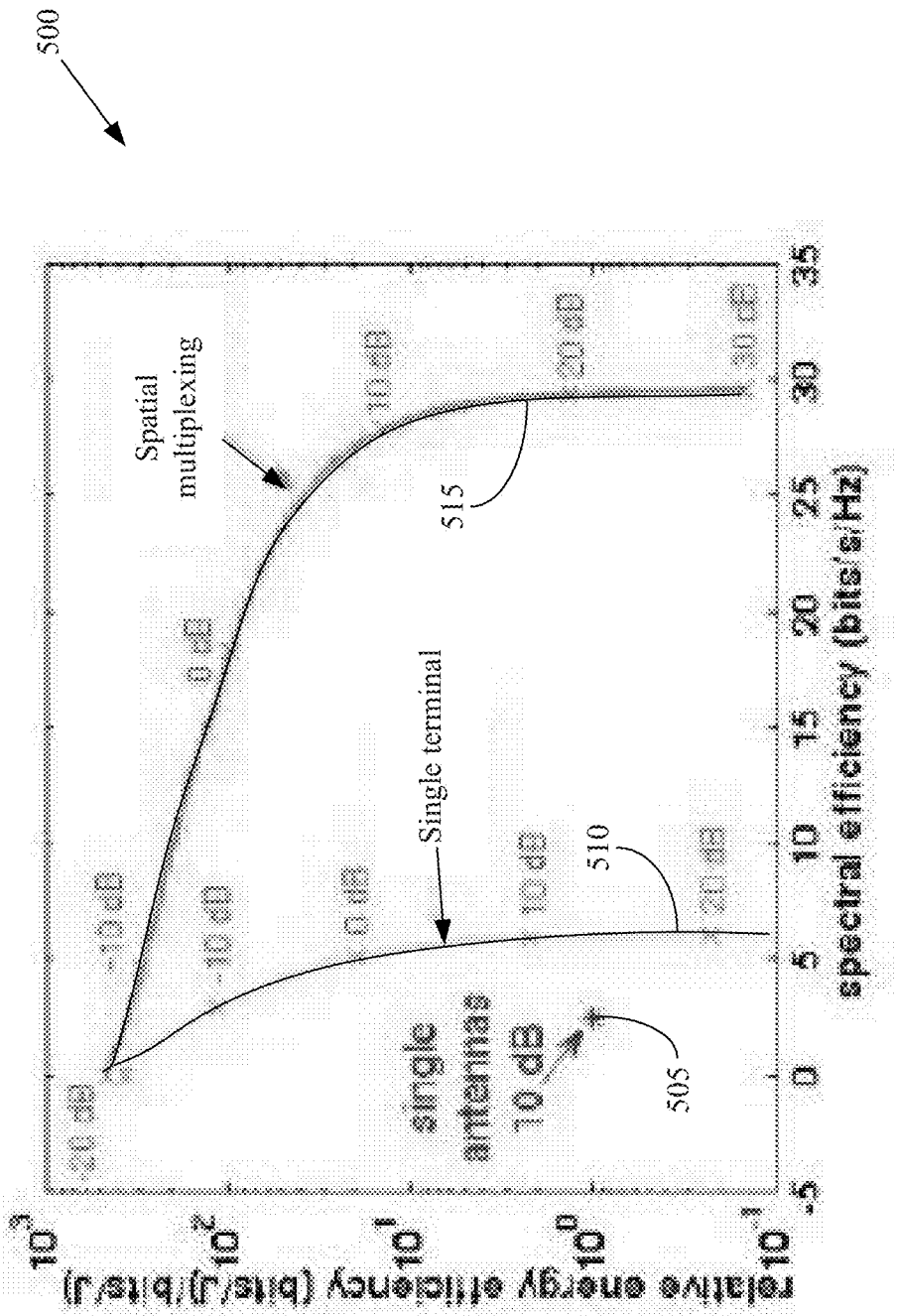
FIG. 5 depicts results of a simulation that illustrate the trade-off between relative energy efficiency and spectral efficiency.

FIG. 5 depicts results 500 of a simulation that illustrate the trade-off between relative energy efficiency and spectral efficiency for the case of M=100 service antennas, K=1 terminal (curve 510), and K>1 (curve 515). The vertical axis indicates the relative energy efficiency and the horizontal axis indicates the spectral efficiency. The results 500 depict energy-efficiency as a relative quantity that is calculated relative to that of a reference scenario comprising a conventional single-antenna link with a forward pilot. The transmission occurs in a slot that consists of T=98 symbols (corresponding to a 500 micro-second slot-duration and a channel delay-spread of 4.76 micro-seconds). The expected SNR of the up-link is 0 dB ($\rho_r$=1), and for the reference scenario the expected SNR of the down-link is 10 dB. The asterisk 505 corresponds to the reference scenario that has a spectral efficiency of 2.55 bits/symbol and relative energy-efficiency of one. The curve 510 was computed assuming a spectral efficiency as a constraint and subject to the constraint on the total downlink power, $\rho_f$. The amount of training in the time period 1≤t≤T was adjusted to maximize the energy-efficiency.

A similar optimization yielded the curve 515, with an additional parameter (K) over which to optimize subject to the constraint K≤t≤T. The points on the curves indicate the total down-link power, e.g. 10 dB corresponds to the same power used in the reference scenario. The plots in FIG. 5 demonstrate that M=100 service antennas yield 100-fold improvements in radiated energy-efficiency compared with the reference scenario. For K=1 terminal this is accomplished by reducing power by a factor of 100 compared with the reference scenario, while maintaining comparable spectral efficiency. For K>1 terminals this is accomplished by reducing power by a factor of 10 and increasing spectral efficiency by a factor of eight. The ability to change the operating point—high energy-efficiency and low spectral efficiency when demand is low, and the converse when demand is high—should be attractive to service providers.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   estimating, for an antenna in an antenna array comprising a plurality of antennas, interference parameters using digital signals generated based on first analog baseband signals, wherein the first analog baseband signals are generated using first analog radiofrequency signals, wherein the first analog radiofrequency signals are received at the antenna on each of a plurality of subcarriers, and wherein each interference parameter is associated with one of a plurality of digital symbols;
   modifying the plurality of digital symbols using the estimated interference parameters;
   encoding the plurality of modified digital symbols;
   converting the plurality of modified digital symbols to second analog baseband signals;
   converting the second analog baseband signals to second analog radiofrequency signals;
   canceling interference from the first analog radiofrequency signals received by the antenna on the plurality of subcarriers using the second analog radiofrequency signals;
   converting, the first analog radiofrequency signals to the first analog baseband signals after canceling interference from the first radiofrequency signals, and
   scheduling subsets of a plurality of users for reception or transmission in half-duplex mode based locations of the plurality of users and angle-of-arrival of signals from the plurality of users.

2. The method of claim 1, wherein the number of interference parameters for the antenna is independent of the number of other antennas in the antenna array.

3. The method of claim 1, wherein estimating the interference parameters comprises estimating the interference parameters to minimize differences between the first analog radiofrequency signals received at the antenna and products of the interference parameters and the plurality of digital symbols.

4. The method of claim 1, comprising converting the first analog baseband signals to the digital signals after canceling the interference from the first analog radiofrequency signals.

5. The method of claim 1, comprising pre-coding the plurality of digital symbols for transmission over an air interface concurrently with canceling interference from the first analog radiofrequency signals received by the antenna on a plurality of subcarriers.

6. The method of claim 5, comprising transmitting the plurality of digital symbols in full-duplex mode and concurrently receiving uplink signals from a plurality of users transmitting in full-duplex mode.

7. The method of claim 5, comprising converting the plurality of digital symbols to a corresponding plurality of analog signals transmitting the corresponding plurality of analog signals in full-duplex mode and concurrently receiving uplink signals from the subsets of users transmitting in the half-duplex mode.

8. The method of claim 7, wherein scheduling the subsets of the plurality of users for reception or transmission in the half-duplex mode comprises scheduling the subsets of the plurality of users for reception or transmission in the half-duplex mode based on an estimate of inter-user interference.

9. The method of claim 7, comprising estimating interference parameters for each antenna in the antenna array and canceling interference from analog signals received by the plurality of antennas in the antenna array using the estimated interference parameters.

10. A transceiver configured to be communicatively coupled to an antenna in an antenna array comprising a plurality of antennas, wherein the transceiver comprises:
    a software logic configured to estimate interference parameters using digital signals generated based on first analog baseband signals, wherein the first analog baseband signals are generated using first analog radiofrequency signals, wherein the first analog radiofrequency signals are received at the antenna on each of a plurality of subcarriers, and wherein each interference parameter is associated with one of a plurality of digital symbols,
    an encoder configured to modify the plurality of digital symbols using the estimated interference parameters and encode the plurality of modified digital symbols;
    a digital-to-analog converter to convert the plurality of modified digital symbols to second analog baseband signals;
    circuitry configured to convert the second analog baseband signals to second analog radiofrequency signals;
    circuitry configured to cancel interference from the first analog radiofrequency signals received by the antenna on the plurality of subcarriers using the second analog radiofrequency signals;
    circuitry configured to convert the first analog radiofrequency signals to the first analog baseband signals after canceling interference from the first radiofrequency signals, and
    circuitry configured to schedule subsets of a plurality of users for reception or transmission in half-duplex mode based locations of the plurality of users and angle-of-arrival of signals from the plurality of users.

11. The transceiver of claim 10, wherein the number of interference parameters for the antenna is independent of the number of other antennas in the antenna array.

12. The transceiver of claim 10, wherein the software logic is configured to estimate the interference parameters to minimize differences between the first analog radiofrequency signals received at the antenna and products of the interference parameters and the plurality of digital symbols.

13. The transceiver of claim 10, comprising receive circuitry configured to convert the first analog baseband signals to the digital signals after canceling the interference from the first analog radiofrequency signals.

14. The transceiver of claim 13, wherein the receive circuitry is configured to provide feedback based upon the digital signals to the software logic, and wherein the software logic is configured to estimate the interference parameters based upon the feedback.

15. The transceiver of claim 13, comprising transmit circuitry configured to pre-code the plurality of digital symbols for transmission over an air interface concurrently with the software logic canceling interference from the first analog radiofrequency signals received by the antenna on a plurality of subcarriers.

16. The transceiver of claim 15, wherein the transmit circuitry is configured to transmit the plurality of digital symbols in full-duplex mode and wherein the receive circuitry is configured to concurrently receive uplink signals from a plurality of users transmitting in full-duplex mode.

17. The transceiver of claim 15, wherein the transmit circuitry is configured to transmit the plurality of digital symbols in full-duplex mode and wherein the receive circuitry is configured to concurrently receive uplink signals from subsets of the plurality of users transmitting in the half-duplex mode.

18. The transceiver of claim 17, wherein the transceiver is configured to schedule the subsets of users for reception or transmission in half-duplex mode based on estimates of inter-user interference.

19. A system comprising:
- a plurality of transceivers, wherein each of the plurality of transceivers is configured to be communicatively coupled to one of a plurality of antennas in an antenna array, and wherein each transceiver comprises:
- a software logic configured to estimate interference parameters using digital signals generated based on first analog baseband signals, wherein the first analog baseband signals are generated using first analog radiofrequency signals, wherein the first analog radiofrequency signals are received at the antenna on each of a plurality of subcarriers, and wherein each interference parameter is associated with one of a plurality of digital symbols,
- an encoder configured to modify the plurality of digital symbols using the estimated interference parameters and encode the plurality of modified digital symbols;
- a digital-to-analog converter to convert the plurality of modified digital symbols to second analog baseband signals;
- circuitry configured to convert the second analog baseband signals to second analog radiofrequency signals;
- circuitry configured to cancel interference from the first analog radiofrequency signals received by the antenna on the plurality of subcarriers using the second analog radiofrequency signals;
- circuitry configured to convert the first analog radiofrequency signals to the first analog baseband signals after canceling interference from the first radiofrequency signals, and
- circuitry configured to schedule subsets of a plurality of users for reception or transmission in half-duplex mode based locations of the plurality of users and angle-of-arrival of signals from the plurality of users.

* * * * *